US010106936B2

United States Patent
Macdonald et al.

(10) Patent No.: US 10,106,936 B2
(45) Date of Patent: Oct. 23, 2018

(54) VIBRATION ISOLATION FOR COMPACTOR

(71) Applicant: Volvo Construction Equipment AB, Eskilstuna (SE)

(72) Inventors: Michael Macdonald, Shippensburg, PA (US); Christopher Grove, Fayetteville, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 15/895,005

(22) Filed: Feb. 13, 2018

(65) Prior Publication Data

US 2018/0171567 A1 Jun. 21, 2018

Related U.S. Application Data

(63) Continuation-in-part of application No. 15/520,205, filed as application No. PCT/US2014/069262 on Dec. 9, 2014.

(51) Int. Cl.
| E01C 19/28 | (2006.01) |
| E01C 19/38 | (2006.01) |
| F16C 3/20 | (2006.01) |
| F16F 15/22 | (2006.01) |

(52) U.S. Cl.
CPC ............ *E01C 19/286* (2013.01); *E01C 19/38* (2013.01); *F16C 3/20* (2013.01); *F16F 15/223* (2013.01); *E01C 2301/00* (2013.01); *F16F 2232/02* (2013.01)

(58) Field of Classification Search
CPC .................................................... E01C 19/286
USPC .......................................... 404/113, 72, 117
See application file for complete search history.

(56) References Cited

U.S. PATENT DOCUMENTS

| 3,966,344 A | * | 6/1976 | Haker | ..................... B06B 1/162 |
| | | | | 404/103 |
| 4,269,536 A | * | 5/1981 | Goehler | ................ E01C 19/286 |
| | | | | 172/184 |
| 4,398,843 A | * | 8/1983 | Bloom, Jr. | ............ E01C 19/286 |
| | | | | 404/117 |
| 5,397,198 A | * | 3/1995 | Bertrand | ............... E01C 19/286 |
| | | | | 188/378 |
| 5,716,162 A | * | 2/1998 | Hodgson | ............... E01C 19/286 |
| | | | | 404/117 |
| 2004/0168531 A1 | * | 9/2004 | Mitsui | ................... E01C 19/286 |
| | | | | 74/86 |

(Continued)

FOREIGN PATENT DOCUMENTS

JP H0747445 Y2 11/1995

OTHER PUBLICATIONS

International Search Report and Written Opinion for PCT/US2014/069262, dated Aug. 26, 2015, 9 pages.

*Primary Examiner* — Raymond W Addie
(74) *Attorney, Agent, or Firm* — Womble Bond Dickinson (US) LLP

(57) ABSTRACT

A vibratory compactor includes a drum, a frame supporting the drum, an eccentric shaft configured to be rotated by a vibration motor, and a primary eccentric weight attached to the eccentric shaft inside the drum. At least one active isolation eccentric weight is located outside the drum so that when the eccentric shaft is rotated, a phase of a vibration generated by the at least one active isolation eccentric weight is substantially opposite to that of a vibration generated by the primary eccentric weight.

15 Claims, 4 Drawing Sheets

(56) References Cited

U.S. PATENT DOCUMENTS

2012/0114416 A1\* 5/2012 Marsolek ............. E01C 19/286
  404/75
2014/0133909 A1\* 5/2014 Hansen ................ E01C 19/286
  404/117

\* cited by examiner

VIBRATION ISOLATION FOR COMPACTOR

PRIORITY

The present application is a continuation-in-part of U.S. application Ser. No. 15/520,205, filed Apr. 19, 2017 which claims priority as a national stage entry of PCT/US2014/069262, filed Dec. 9, 2014.

TECHNICAL FIELD

The disclosure generally relates to construction vehicles, and more particularly, to active vibration isolation for a compactor with a vibratory roller used in the construction of roads.

BACKGROUND

Vibratory compactors have parts that are caused to vibrate due to the rotation of a shaft that incorporates an eccentric weight. It is desirable to properly isolate the vibration from the rest of the structure for such compactors. For example, the vibration isolation method used for the drums of vibratory compactors for soil and asphalt is schematically shown in FIG. 1.

Vibration isolation is usually required between the drum and the rest of the machine, i.e., a frame as shown in FIG. 1.

Vibration isolation is typically achieved by using a resilient material, like rubber or metallic spring which is configured to connect the vibrating part to the rest of the machine. The use of rubber isolators between 'the drum and a carrier bearing' and 'the drum and a drive plate' is shown in FIG. 1.

A more sophisticated method of vibration isolation utilizes a secondary mass, which is usually referred to as "dual stage isolation". If the mass and isolators are chosen correctly, this dual stage isolation system can result in better isolation than the "single stage isolation" system shown previously. The aim of the dual stage isolation system is to allow the dual stage isolation mass to have a lower amplitude vibration than the drum, thus transmitting less vibration to the frame.

The concept of this dual stage isolation system has been used in the past on an Ingersoll-Rand asphalt compactor. The dual stage isolation system is shown schematically in FIG. 2. There is a dual stage isolation mass between "the drum and the carrier bearing" and between "the drum and the drive plate", and each of the components is buffered with an isolator.

SUMMARY

The active isolation apparatus according to one embodiment of the present disclosure takes the dual stage isolation system and adds a mechanism that improves the isolation. The conventional dual stage isolation mass still has some vibratory amplitude, even though the vibration amplitude of the dual stage isolation mass is less than that of the drum. The active isolation apparatus according to one embodiment of the present disclosure adds an eccentric weight to the dual stage mass in such a way that it counteracts the motion of the dual stage mass caused by the drum vibration.

The active isolation apparatus according to one embodiment of the present disclosure comprises three eccentric weights; the primary one that is still inside the drum, and two additional weights in each of the active isolation masses. (The term "active isolation mass" is used to differentiate it from the passive isolation mass utilized in the usual dual stage isolation system in FIG. 2.) In one embodiment, the active isolation eccentric weights are out of phase with the primary eccentric weight that is inside the drum. According to one embodiment, all three eccentric weights are on a common shaft that is rotated by a single vibration motor 50.

To describe this behavior in a different way, it is assumed that the drum is vibrating with an amplitude of 5 mm. For the dual stage system shown in FIG. 2, it is also assumed that the dual stage isolation mass is vibrating with an amplitude of 3 mm. So the frame will experience the vibration caused by the 3 mm amplitude.

In the present disclosure, let us assume that the active isolation eccentric weight was chosen so that it causes the active isolation mass to be vibrated with an amplitude of 3 mm, and it is oriented so that the direction of this motion is directly opposite to the motion in the dual stage case. The effect of the drum vibration and the effect of the active isolation eccentric weight will cancel each other. The resultant vibration amplitude of the active isolation mass is zero. Thus, no vibration is imparted to the frame.

The above illustration is the ideal case. In practice, it is expected that there will still be some motion of the active isolation mass, but it is also expected that it will be very small compared to the vibration without the additional eccentric weight.

The active isolation apparatus of the present disclosure, according to a second embodiment, may be applied to the single stage isolation system shown in FIG. 1. Particularly, the active isolation eccentric weights may be attached to or configured to rotate within the frame itself. One skilled in the art will appreciate that the primary eccentric weight may impart a greater amplitude of vibration upon the frame without the active isolation masses, but the active isolation eccentric weight may be designed to generate a proportionally greater vibration amplitude. Further, while the ideal case would completely cancel transmission of vibration from the drum to the frame, significant reduction in the transmission of vibration may still provide significant benefits.

The active isolation apparatus according to the present disclosure is applicable to any situation where vibration is caused by a rotating shaft with an eccentric weight. For the sake of simplicity of explanation of the concept, the rest of this disclosure assumes the drum of a vibratory compactor as the part that is being isolated.

DETAILED DESCRIPTION

As described in the "BACKGROUND" section, a roller drum of a vibratory compactor includes a shaft that incorporates an eccentric weight which generates a vibration while being rotated. In the case where such a vibration is transmitted to a frame and other elements of the compactor, breakage or failure of parts may be caused. Thus, there is a need for a solution to reduce the vibration transmitted during rotation of the eccentric shaft of the roller drum to other parts of the compactor.

Figure 1:
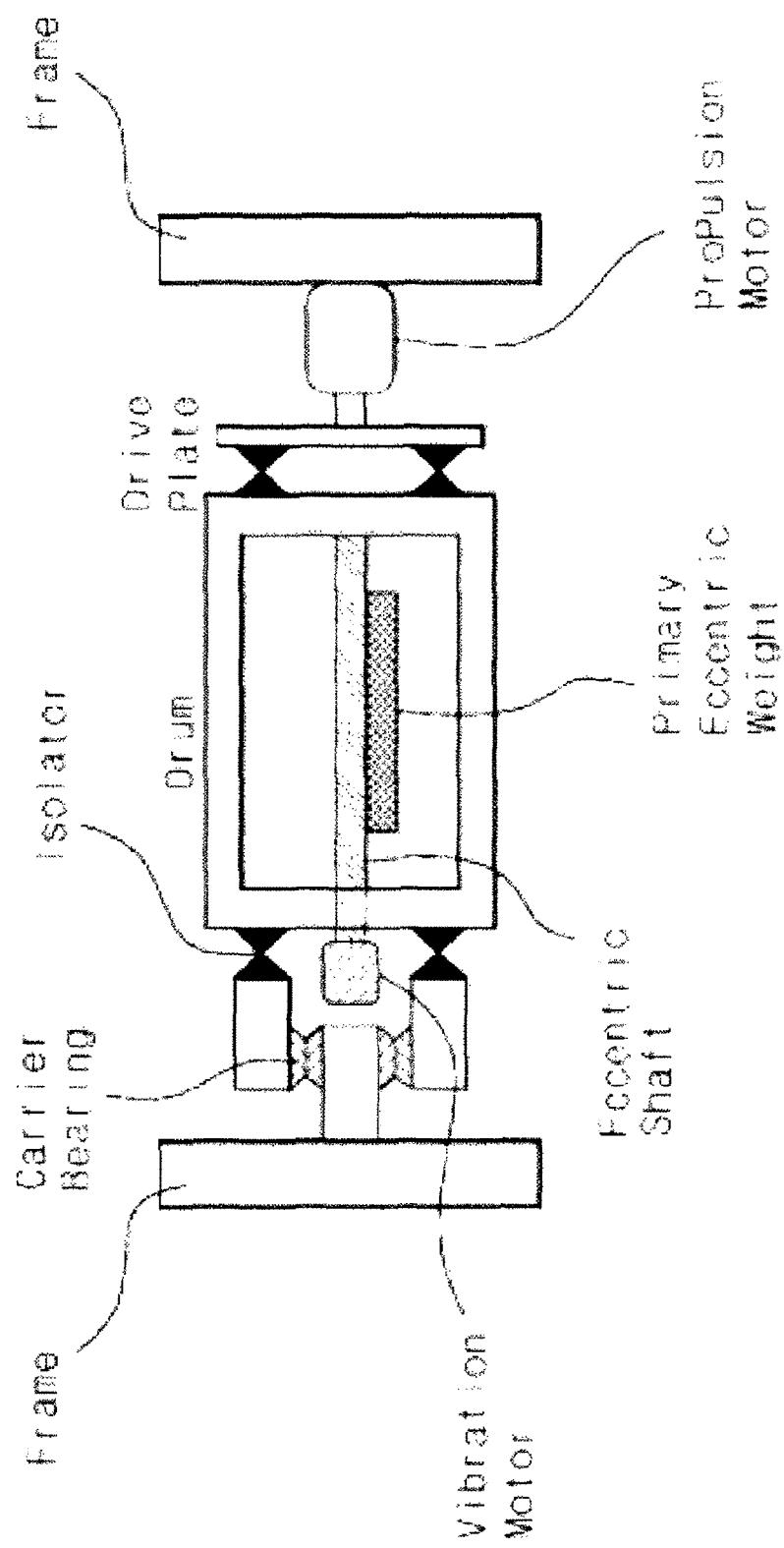
FIG. 1 is a schematic cross-section view showing one example of a vibration isolation system for reducing the transmission of a vibration generated from a vibratory compactor in accordance with the prior art.
Figure 2:
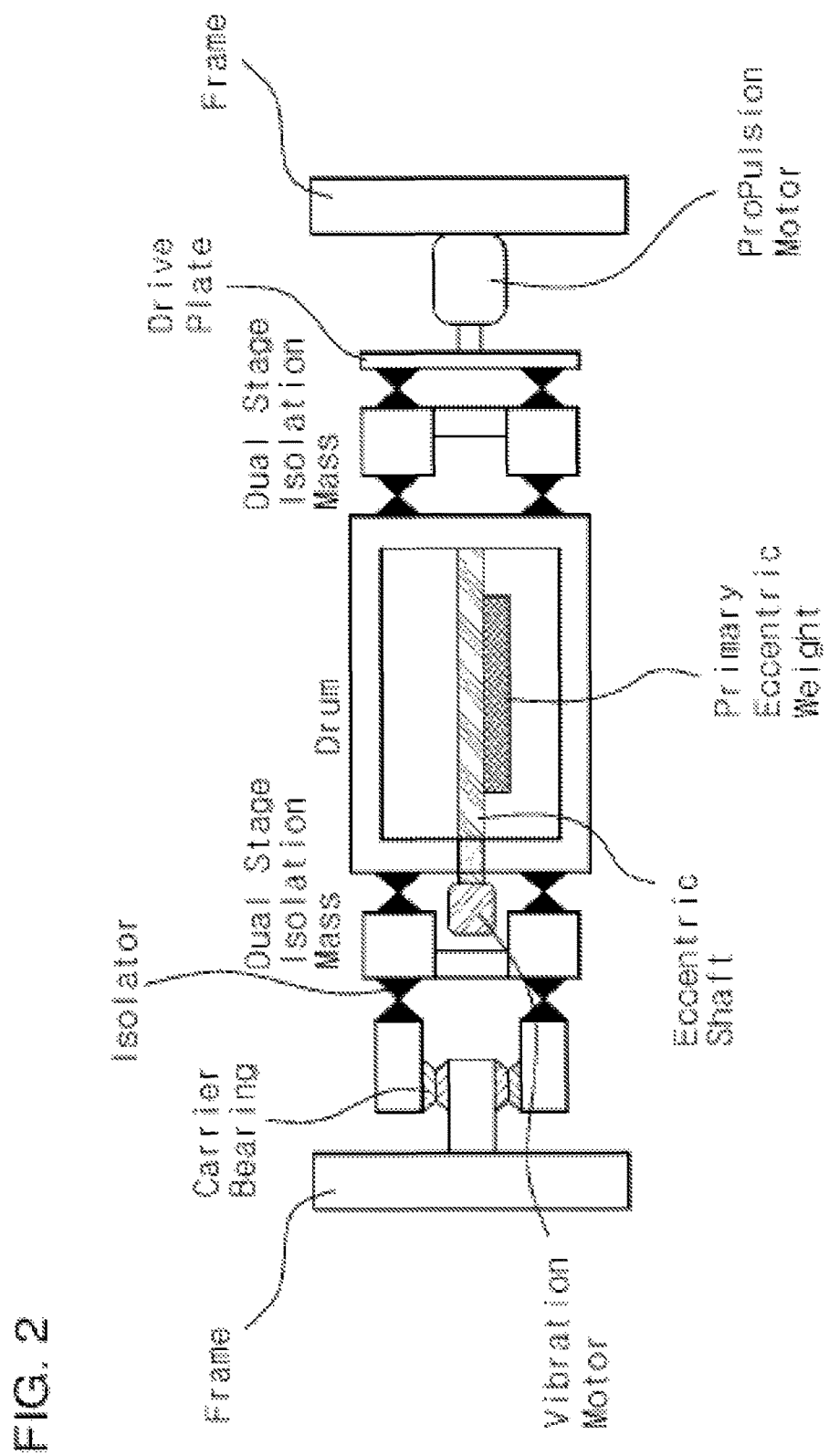
FIG. 2 is a schematic cross-section view showing another example of a vibration isolation system for reducing the transmission of a vibration generated from a vibratory compactor in accordance with the prior art.

The single stage isolation system in accordance with the prior art as shown in FIG. 1, adopts an isolator for isolating a drum from a frame to reduce a vibration, and the dual stage isolation system in accordance with the prior art as shown in FIG. 2 adopts a dual stage isolation mass between a drum and a carrier bearing and between the drum and a drive plate so as to isolate the drum from the frame. The active isolation apparatus in accordance with the present disclosure adopts new eccentric weights to generate a vibration having an opposite phase to that of the vibration generated by a primary eccentric weight that is positioned inside the drum so that vibration is more efficiently reduced.

Figure 3:
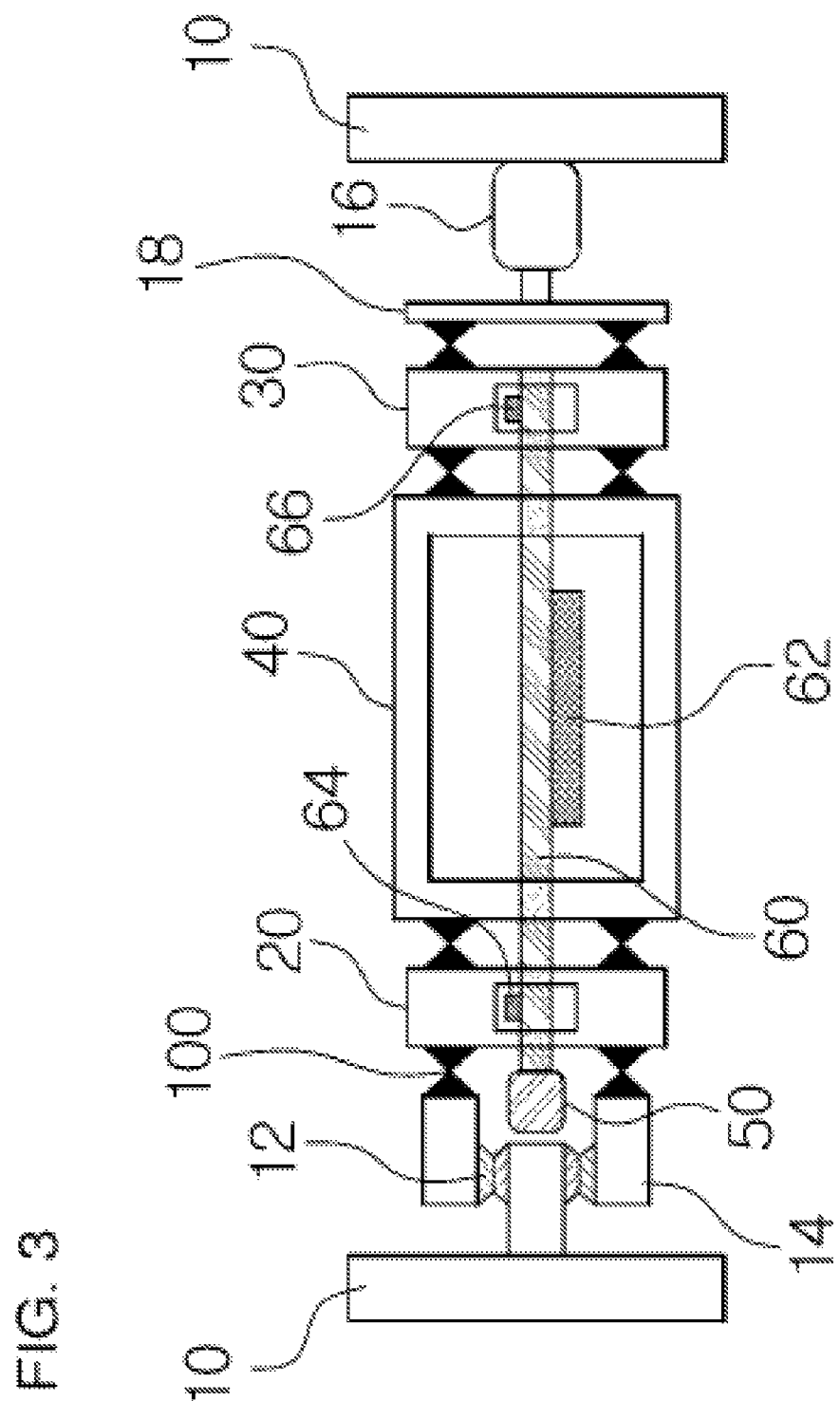
FIG. 3 is a schematic cross-section view showing an active isolation apparatus for a vibratory compactor in accordance with an embodiment of the present disclosure.

FIG. 3 is a schematic cross-section view showing an active isolation apparatus for a vibratory compactor in accordance with one embodiment of the present disclosure.

The active isolation apparatus in accordance with the present disclosure comprises a drum 40. The active isolation apparatus may further comprise a propulsion motor 16 for rotating the drum 40. The drum 40 is typically a roller drum that is rotated. The roller drum 40 for a vibratory compactor, and an eccentric weight 62 disposed therein, effectively compact a ground surface using a vibration generated by the eccentric weight together with a force caused by the weight of the drum itself to generate a compressive force for compacting the ground surface.

In an embodiment, the propulsion motor 16 can be supplied with power from an engine of the compactor, which is connected thereto through a frame 10. The propulsion motor 16 may be connected to another power supply means. The propulsion motor generates a propulsive force for driving the drum.

The active isolation apparatus in accordance with the present disclosure comprises a drive plate 18 that is positioned between the propulsion motor 16 and the drum 40 and is connected to the propulsion motor to transmit a rotating force to the drum.

The active isolation apparatus in accordance with the present disclosure comprises a drum support 14. The drum support 14 serves to rotatably support the drum 40. The drum support 14 is connected to a carrier bearing 12 so that the drum 40 can be rotated with respect to the frame 10.

The active isolation apparatus in accordance with an embodiment of the present disclosure comprises a first active isolation mass 20 and a second active isolation mass 30. The first active isolation mass 20 is disposed between the drum support 14 and the drum 40, and the second active isolation mass 30 is disposed between the drive plate 18 and the drum 40. Referring to FIG. 2, the isolation mass disposed between the drum and the frame and between the drum and the drive plate is a part that merely has a constant weight and a simple structure. The isolation mass of the dual stage isolation system has a shortcoming in that it does not have a structure or a function that generates a vibration. On the contrary, each of the active isolation masses 20, 30 of the active isolation apparatus in accordance with the present embodiment of the present disclosure has a space defined therein to allow each of the active isolation eccentric weights 64 and 66 to be rotated in the space. In addition, each of the active isolation masses 20, 30 has a through-hole formed therein to allow an eccentric shaft 60 to be penetratingly fitted thereto.

The active isolation apparatus in accordance with the present disclosure comprises the eccentric shaft 60 rotating in a state of penetrating passing through the first active isolation mass 20, the drum 40, and the second active isolation mass 30, and a vibrating motor 50 configured to rotate the eccentric shaft 60. In the prior art, the eccentric shaft is penetratingly fitted into only the drum, and serves merely to generate a vibration inside the drum during the rotation thereof. On the contrary, in the active isolation apparatus in accordance with the present embodiment of the present disclosure, the eccentric shaft 60 is designed to generate a vibration inside the active isolation masses 20, 30 as well as the drum 40 during the rotation thereof.

Referring to FIG. 3, it has been shown that although the eccentric shaft 60 is penetratingly fitted into the first active isolation mass 20, the drum 40 and the second active isolation mass 30 in this order, it is merely one example and the eccentric shaft 60 may be penetratingly fitted into the first active isolation mass 20, the drum 40 and the second active isolation mass 30 in the order modified depending on the design of the vibratory compactor. In addition, referring to FIG. 3, the vibration motor 50 is disposed between the first active isolation mass 20 and the drum support 12 (i.e., disposed in proximity to a left frame), but may be disposed between the second active isolation mass 30 and the drive plate 18 (i.e., disposed in proximity to a right frame). The active isolation apparatus in accordance with the present disclosure comprises a plurality of connectors 100 disposed between the drum support 14 and the first active isolation mass 20, between the first active isolation mass and the drum 40, between the drum and the second active isolation mass 30, and between the second active isolation mass and the drive plate 18.

The active isolation apparatus in accordance with one embodiment of the present disclosure comprises a primary eccentric weight 62 attached to the eccentric shaft 60 inside the drum 40, and one or more active isolation eccentric weights 64 and 66 attached to the eccentric shaft 60, respectively, inside the first active isolation mass 20 and the second active isolation mass 30. The primary eccentric weight 62 is rotated together with the rotation of the eccentric shaft 60 to generate a vibration inside the drum 40. The active isolation eccentric weights 64, 66 can be disposed inside the first active isolation mass 20 and the second active isolation mass 30, and are rotated together with the rotation of the eccentric shaft 60 to generate a vibration inside the active isolation masses 20, 30. The active isolation eccentric weight 64 positioned inside the first active isolation mass 20 can be referred to as a first active isolation eccentric weight 64, and the active isolation eccentric weight 66 positioned inside the second active isolation mass 30 can be referred to as a second active isolation eccentric weight 66.

In the active isolation apparatus in accordance with the present disclosure, the active isolation eccentric weights 64, 66 and the primary eccentric weight 62 are configured such that when the eccentric shaft 60 is rotated, a phase of a vibration generated by the active isolation eccentric weights is opposite to that of a vibration generated by the primary eccentric weight. Referring to FIG. 3, the primary eccentric weight 62 and the two active isolation eccentric weights 64 and 66 are attached to the eccentric shaft 60 in different directions from each other. In order to reduce a vibration generated during the rotation of the primary eccentric weight 62, the active isolation eccentric weights 64, 66 are preferably attached to the eccentric shaft 60 in the opposite direction to a direction in which the primary eccentric weight is attached to the eccentric shaft 60. But this is an assumption of the ideal case, and the directions in which the primary eccentric weight 62 and the active isolation eccentric weights 64, 66 are attached to the eccentric shaft 60 may be adjusted depending on the vibratory compactor.

In addition, the weights of the active isolation eccentric weights 64, 66 may be adjusted to reduce a vibration generated by the primary eccentric weight 62. The weight of the primary eccentric weight 62 and the vibratory compactor may be adjusted depending on a speed range in which a rotary shaft is rotated. Further, the active isolation eccentric weights 64, 66 should be adjusted to have a size enough to be accommodated in each active isolation masses 20, 30. The size of the internal space of the active isolation masses 20, 30 should be formed enough for the active isolation eccentric weights 64, 66 to be rotated based on the through-hole in which the eccentric shaft 60 is rotated.

Resultantly, by virtue of the above configuration, when the eccentric shaft 60 is rotated, a vibration generated by the active isolation eccentric weights 64, 66 can cancel the vibration generated by the primary eccentric weight 62, and thus a vibration generated from the drum 40 is prevented from being transmitted to the frame 10 of the compactor.

The active isolation apparatus in accordance with another embodiment of the present disclosure may comprise at least one isolator disposed between the first active isolation mass 20 and the drum 40, between the first active isolation mass 20 and the drum support 14, between the second active isolation mass 30 and the drive plate 18, and between the second active isolation mass 30 and the drum 40. Further, at least one of the connectors 100 may serve as an isolator to reduce the vibration.

The isolator can reduce a vibration generated from the drum 40, the first active isolation mass 20, and the second active isolation mass 30 during the rotation of the drum. Preferably, the isolator can be made of a resilient material (e.g., rubber) that can absorb the vibration.

The active isolation apparatus in accordance with another embodiment of the present disclosure can be described in an aspect including the frame 10 of the vibratory compactor.

In other words, the active isolation apparatus in accordance with another embodiment of the present disclosure may comprise a frame 10 that is provided at one side with a carrier bearing 12 and a drum support 14 to rotatably support the drum 40 and is formed at the other side with a propulsion motor 16 connected to a drive plate 18. The carrier bearing 12 and the drum support 14 allow the drum 40 to be rotated while being supported by a constant shaft between the frames 10.

The active isolation apparatus in accordance with another embodiment of the present disclosure comprises a first active isolation mass 20 disposed between the drum support 14 and the drum 40, a second active isolation mass 30 disposed between the drive plate 18 and the drum. In addition, the active isolation apparatus comprises an eccentric shaft 60 configured to be rotated while penetrating through the first active isolation mass 20, the drum 40, and the second active isolation mass 30, a primary eccentric weight 62 attached to the eccentric shaft 60 inside the drum, active isolation eccentric weights 64 and 66 attached respectively to the eccentric shaft 60 inside the first active isolation mass 20 and the second active isolation mass 30, and a vibration motor 50 configured to rotate the eccentric shaft 60.

In the active isolation apparatus in accordance with another embodiment of the present disclosure, when the eccentric shaft 60 is rotated, a phase of a vibration generated by the active isolation eccentric weights 64, 66 is opposite to that of a vibration generated by the primary eccentric weight 62. The vibration generated by the active isolation eccentric weights 64, 66 cancels the vibration generated by the primary eccentric weight 62.

Figure 4:
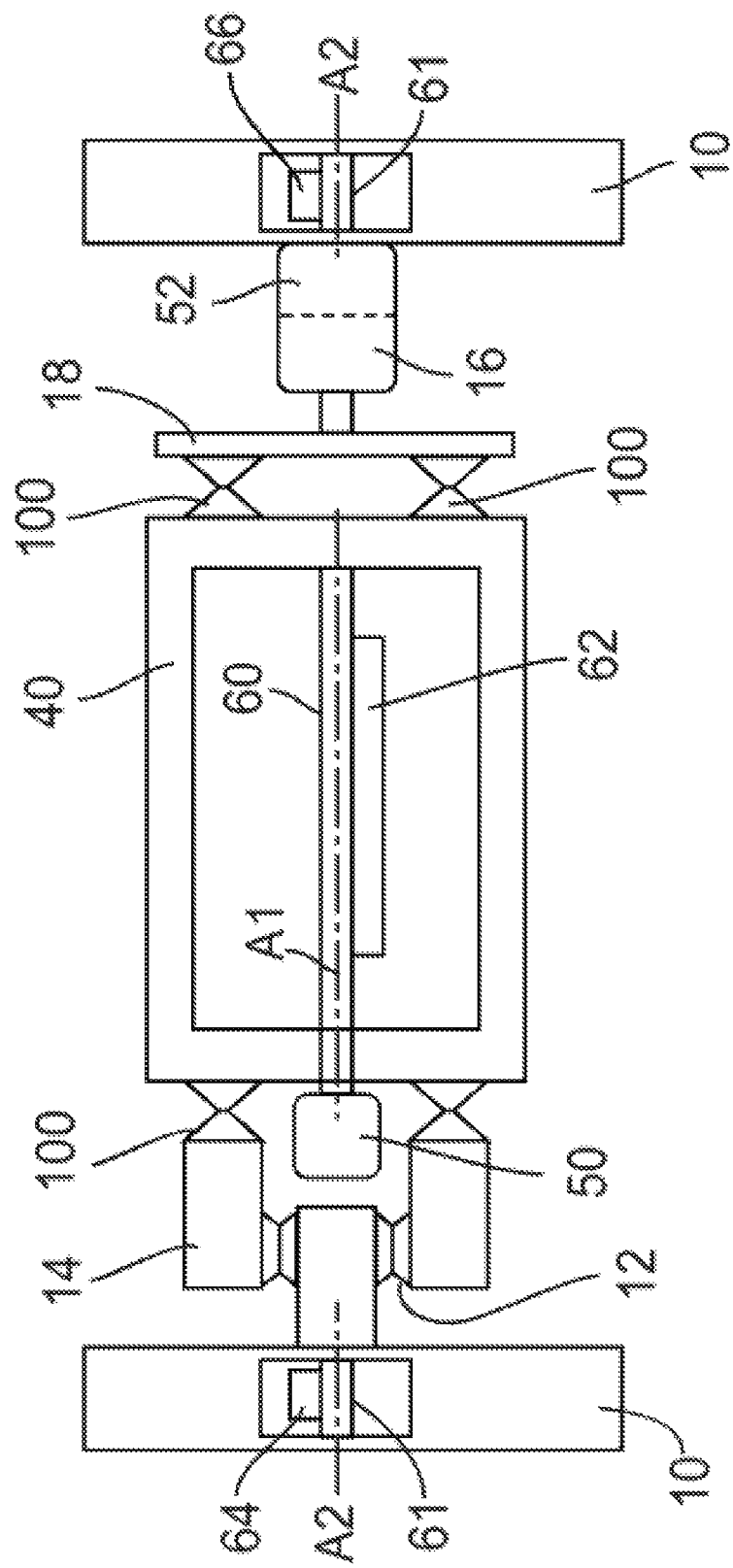
FIG. 4 is a schematic cross-section view showing an active isolation apparatus for a vibratory compactor in accordance with another embodiment of the present disclosure.

The active isolation apparatus in accordance with another embodiment of the present disclosure may be applied to the single stage isolation system shown in FIG. 1. The active isolation apparatus of this embodiment in shown in FIG. 4. Particularly, the active isolation eccentric weights 64, 66 may be attached to or configured to rotate within the frame 10 itself. One skilled in the art will appreciate that the primary eccentric weight 62 may impart a greater amplitude of vibration upon the frame 10 without the active isolation masses 20, 30, but the active isolation eccentric weights 64, 66 may be designed to generate a proportionally greater vibration amplitude. Further, while the ideal case would completely cancel transmission of vibration from the drum 40 to the frame 10, significant reduction in the transmission of vibration may still provide significant benefits.

The active isolation apparatus in accordance with another embodiment of the present disclosure may retain the active isolation masses of the dual stage isolation system shown in FIG. 2, and locate the active isolation eccentric weights 64, 66 attached to or within the frame 10.

The active isolation apparatus in accordance with another embodiment of the present disclosure may employ a first vibration motor 50 to rotate the eccentric shaft 60 and primary eccentric weight 62. A second vibration motor 52 may be used to rotate a second eccentric shaft 61, such as a flexible shaft, to rotate the at least one active isolation eccentric weights 64, 66. Therefore the active isolation eccentric weights 64, 66 may be separately driven from the primary eccentric weight 62 even if synchronized rotation may be preferred for generating canceling vibrations. In one embodiment, a center of rotation A1 of the primary eccentric weight 62 is substantially coaxial with a center of rotation A2 of the at least one active isolation eccentric weight 64, 66.

The active isolation apparatus in accordance with another embodiment of the present disclosure may be configured such that an eccentric force generated by the primary eccentric weight 62 is greater than twice an eccentric force generated by one active isolation eccentric weights 64, 66 due to a reduction in amplitude of the vibration from the drum 40 transmitted to be frame 10 provided by the resilient isolator type connectors 100.

The active isolation apparatus in accordance with the present disclosure may facilitate a new method of reducing vibration perceived by the frame 10 of a vibratory compactor as the result of the primary eccentric weight 62 being rotating within the drum 40. The method may include reducing an amplitude of a compaction vibration perceived by the frame 10 by positioning a plurality of resilient isolators between the drum 40 and the frame, and rotating, at a location outside of the drum, at least one active isolation eccentric weight 64, 66 so that a phase of a vibration generated by the at least one active isolation eccentric weight is substantially opposite to that of a vibration generated by the primary eccentric weight. According to one embodiment, the primary eccentric weight 62 and the at least one active isolation eccentric weight 64, 66 are each attached to the same eccentric shaft 60, and rotating the at least one active isolation eccentric weight comprises rotating the eccentric shaft with the vibration motor 50.

The primary advantage of the present disclosure is as follows. First, failure or breakage due to a vibration of other parts (e.g., drum frame, cooling packages, batteries, rollover protection apparatus (ROPS)) of the machine is prevented, and thus it can be expected that the costs spent for repair and replacement of parts due to failure will be reduced. The suppressed vibration of the machine provides an operator with increased comfort. In addition, since a vibratory load imposed on the machine will be much less, the suppression of a noise can be expected during the work.

The foregoing description of the embodiments of the present disclosure has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A vibratory compactor, comprising:
   a drum;
   a frame supporting the drum;
   an eccentric shaft configured to be rotated;
   a primary eccentric weight attached to the eccentric shaft inside the drum;
   a vibration motor configured to rotate the eccentric shaft;
   at least one active isolation eccentric weight located outside the drum that generates a phase of a vibration that is substantially opposite to that of a vibration generated by the primary eccentric weight as the primary eccentric weight is rotated inside the drum.

2. The vibratory compactor according to claim 1, wherein the at least one active isolation eccentric weight is attached directly to frame.

3. The vibratory compactor according to claim 1, wherein the at least one active isolation eccentric weight is located within frame.

4. The vibratory compactor according to claim 1, wherein the at least one active isolation eccentric weight is operably attached to the vibration motor.

5. The vibratory compactor according to claim 1, wherein the at least one active isolation eccentric weight is driven by a flexible shaft.

6. The vibratory compactor according to claim 1, wherein the at least one active isolation eccentric weight is driven by a second vibration motor.

7. The vibratory compactor according to claim 1, further comprising at least one active isolation mass disposed between the frame and the drum.

8. The vibratory compactor according to claim 7, wherein the at least one active isolation eccentric weight is rotatable within the at least one active isolation mass.

9. The vibratory compactor according to claim 8, wherein the at least one active isolation mass comprises two active isolation masses, one adjacent to each end of the drum, and the at least one active isolation eccentric weight comprises two active isolation eccentric weights, one inside of each active isolation mass.

10. The vibratory compactor according to claim 8, wherein the at least one active isolation eccentric weight is attached to the eccentric shaft.

11. The vibratory compactor according to claim 1, further comprises at least one resilient isolator disposed between the drum and the frame.

12. The vibratory compactor according to claim 1, wherein a center of rotation of the primary eccentric weight is substantially coaxial with a center of rotation of the at least one active isolation eccentric weight.

13. The vibratory compactor according to claim 1, wherein an eccentric force generated by the primary eccentric weight is greater than twice an eccentric force generated by one active isolation eccentric weight.

14. A method of reducing vibration perceived by a frame of a vibratory compactor as the result of a primary eccentric weight being rotating within a drum, the method comprising:
    reducing an amplitude of a compaction vibration perceived by the frame by positioning a plurality of resilient isolators between the drum and the frame; and
    rotating, at a location outside of the drum, at least one active isolation eccentric weight so that a phase of a vibration generated by the at least one active isolation eccentric weight is substantially opposite to that of a vibration generated by the primary eccentric weight.

15. The method of claim 14, wherein the primary eccentric weight and the at least one active isolation eccentric weight are each attached to an eccentric shaft, and rotating the at least one active isolation eccentric weight comprises rotating the eccentric shaft with a vibration motor.

\* \* \* \* \*